United States Patent [19]
Takashi

[11] 4,111,233
[45] Sep. 5, 1978

[54] WATER SUPPLY SUSPENDING IMPLEMENT WITH STOPPING PIECE

[76] Inventor: Kurioka Takashi, 15-15, 1-chome, Higashinakamoto, Higashinariku, Osaka, Japan

[21] Appl. No.: 786,843

[22] Filed: Apr. 12, 1977

[30] Foreign Application Priority Data

Apr. 13, 1976 [JP] Japan ............................ 51/46507[U]

[51] Int. Cl.² .......................................... F16L 55/10
[52] U.S. Cl. .................................................... 138/89
[58] Field of Search ............................ 138/89, 90, 91; 166/196, 192

[56] References Cited

U.S. PATENT DOCUMENTS

| 2,924,246 | 2/1960 | Markel | 138/89 |
| 3,032,069 | 5/1962 | Ficklin | 138/89 |
| 3,044,496 | 7/1962 | Maisch | 138/89 |
| 3,669,139 | 6/1972 | Gajdos | 138/89 |
| 3,889,714 | 6/1975 | Wilger et al. | 138/89 |
| 3,901,280 | 8/1975 | Bobo | 138/89 |
| 3,993,103 | 11/1976 | Hammer | 138/89 |

Primary Examiner—Richard E. Aegerter
Assistant Examiner—L. Footland
Attorney, Agent, or Firm—Browdy and Neimark

[57] ABSTRACT

A pipeline expansion plug comprises a cylindrical element driven by a lever working through links to expand the plug. Passing through the cylindrical element is a device for rotatably adjusting the degree of expansion of the plug.

1 Claim, 3 Drawing Figures

WATER SUPPLY SUSPENDING IMPLEMENT WITH STOPPING PIECE

FIELD OF INVENTION

The present invention relates to an expansion plug for a water supply pipe.

BACKGROUND OF THE INVENTION

In a customary water supply suspending implement with stopping plug, the water supply suspending plug is inserted into the water pipe at the water supply side by cutting off one portion of the water pipe under hindrance, and the water supply suspending plug is expanded successively until it press-contacts with the inside face of the water piping by advancing it by means of a screw tube. Such devices have the defect that much water drains from the water supply side during the time it takes to attain the press-contact state and this causes the unsatisfactory condition of submerging or at least wetting the work location. Also the screw motion of the screw cylinder becomes difficult since the inserted water supply suspending piece is being pushed back in the case of high water pressure.

DETAILED DESCRIPTION

Figure 1:
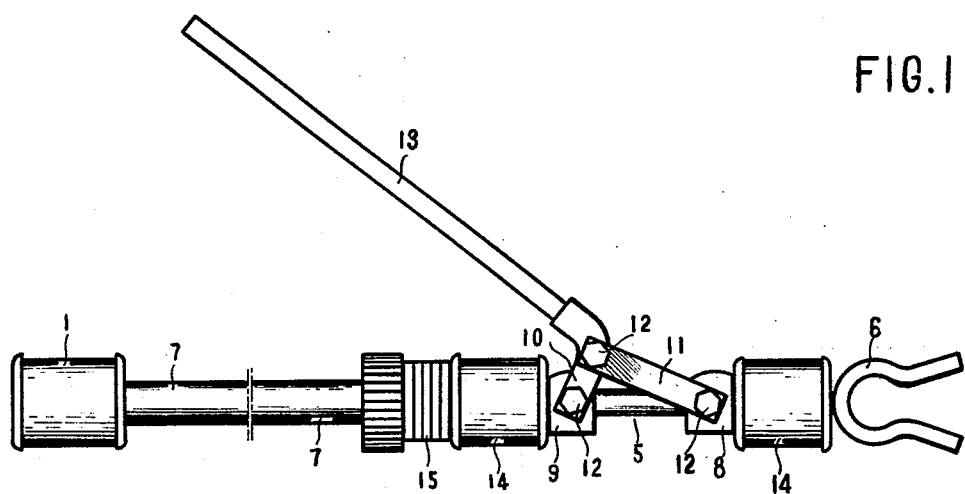
FIG. 1 is a side view of the whole implement according to the present device shown at opened state.

An expansion plug 1 of elastic material is provided between a pair of spaced washers or plates, one of such washers or plates having attached thereto a screw having a normal thread 2, extending in an axial direction. Extending from the end of the normal screw 2 is a second screw 3 having a reverse screw thread. A cornered nut, such as the hexagonal nut 4, is screwed over the normal screw 2 to a position abutting the plate or washer from which such screw 2 extends.

Screwed over the inverse screw thread 3 is an elongated rod 5 having a turning handle 6 at its opposite end. Concentric with the screws 2 and 3 and the elongated rod 5 and extending thereabout and also about the nut 4 is an outer cylindrical tube 7 which extends along the elongated rod 5 for only a portion of its length. Adjacent the free end of the outer tube 7 and also surrounding the elongated rod in a concentric manner are, in series, an adjusting ring 15, a first elastic buffer tube 14, a first force-contacting opening and closing element 9, a second force-contacting opening and closing element 8, and a second elastic buffer tube 14, this latter buffer tube 14 abutting the turning handle 6 of the elongated rod 5. All the elements 7, 8, 9, 14 and 15 are free to slide axially with respect to the elongated rod 5.

Pivotally connected to the first forced-contacting opening and closing element 9 is a front moving link 10. Similarly connected to the first forced-contacting opening and closing element 9 is a rear moving link 11 having a length somewhat greater than that of the link 10. These links are pivoted at the hinge pins 12. Provided on one of the links, suitably a curved portion of the front link 10, is an elongated handle or guide arm 13 which serves as a lever.

The present device relates to a water supply suspending implement with a stopping plug wherein the plug 1 is made of an elastic material. The normal screw thread 2 has at its forward end the smaller diameter screw of reverse screw thread 3. The cornered nut 4 is thread-fitted to said normal screw thread part 2 and the tip end of the elongated rod 5 is thread-fitted to said reverse screw thread part 3 and its rear end is extended outwards so as to fix the turning handle 6. The outer tube 7 is inserted loosely over the forward part of said elongated rod 5 so as to be fitted to said cornered nut 4 at its tip end, and the pair of forced-contacting opening and closing elements 8-9 is inserted slidably at its rearward part, with the front and rear movable links 10-11 being hinge-attached at 12 to these elements, and the guide arm 13 being fixed to one side of said links. The elastic buffer tubes 14-14 are inserted slidably in an abutting state on said elongated rod 5 at positions respectively between the rear forced-contacting opening and closing element 8 and turning handle 6, and between front forced-contacting opening and closing element 9 and outer tube 7. Any number of adjusting rings 15 as may be necessary are inserted into a position between rear end of outer tube 7 and elastic buffer tube 14.

Figure 2:
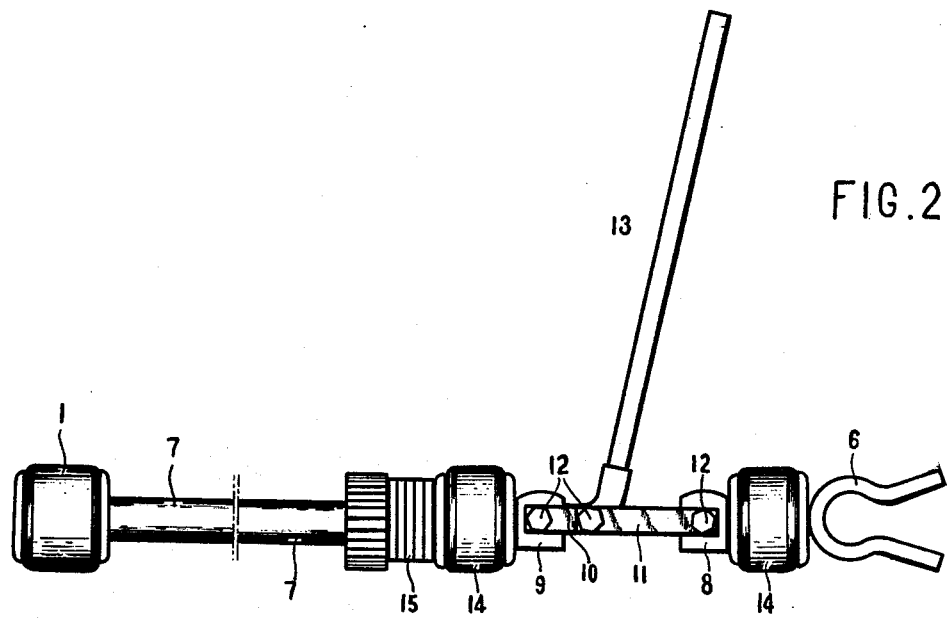
FIG. 2 is a side view of the same implement shown at elastically contracted state.
Figure 3:
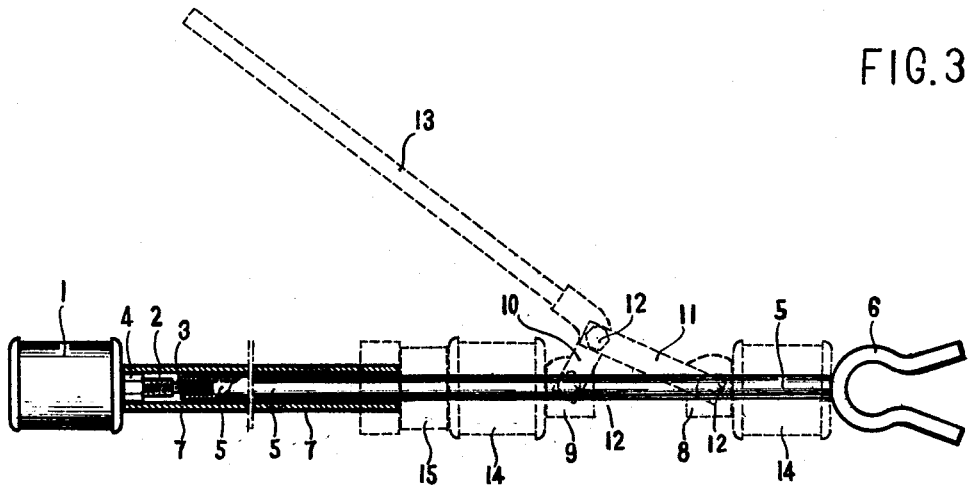
FIG. 3 is a partial sectional view showing the main part.

The present device is constituted as noted above, and its operation and effect will be explained according to the exemplified drawings as follows. FIG. 1 shows an outside view of the implement, and when guide arm 13 is being moved rearwards as shown in FIG. 2, the front and rear moving links 10-11 move the forced-contacting opening and closing elements 8-9 forwards and rearwards, respectively, while compressing elastic buffer tubes 14-14, and this movement is made relatively easy by aid of the elastic buffer tubes 14-14. The distance between the forced-contacting opening and closing elements 8-9 thus becomes large, and at this opening state, the water supply suspending plug 1 at the tip end is pushed by the tip end of the outer tube 7 through the abutment by the forward elastic buffer tube 14, and the adjusting ring 15. This causes the water supply suspending plug 1 made of an elastic material to expand and to press-contact with the inner peripheral face of the water piping into which the plug has been inserted at the water supply side so as to stop the flow of water, and this operation is performed at the state as shown in FIG. 2. Next, in order to leave only the water supply suspending plug 1 within the water piping from the above state, the cornered nut 4 screw-fitted to normal screw thread 2 at the root part of the extending stem is screw-advanced by turning the outer tube 7 utilizing handle part 6 to eliminate the gap existing between the cornered nut 4 and water supply suspending plug 1, thereby effectively lengthening the extension at the end of the rod 5 and augmenting the press-contacted and expanded state of the water supply suspending plug 1. And, in this case, in order to prevent simultaneous turning of outer tube 7 and the expanded plug 1, the screw-advancing of the cornered nut 4 is performed by turning the handle 6 while holding the tube 7. In the case of separating of screw-fitting of reverse screw thread part 3 at the tip end of elongated rod 5, in order to prevent simultaneous turning of elongated rod 5 and water supply suspending piece 1, screw-separating of elongated rod 5 is performed by holding outer tube 7. By the above operation, the elongated rod 5 separated from the expanded plug 1 and the outer tube 7, capable of free separation from cornered nut 4, is drawn out of the water piping. Repair of the water piping water supply is performed while the expanded plug 1 is left in the pipe in its water supply suspending state. And after the repair, the tube 7 and the elongated rod 5 are inserted into the water piping and the tip end of outer tube 7 is fitted to cornered nut 4 and tip end of elongated rod 5 is screw-fitted to reverse screw thread part 3, and cornered nut 4 is screwed on so that the plug 1 can be returned back to the original free drawing state to be withdrawn freely from the pipe by elongated rod 5 whereby both sides of the water piping are in a state to pass water and the repair is completed.

And even if the inside diameter of the water pipe differs somewhat this implement can be applied common to a wide range of diameters of piping by changing inserting numbers of adjusting ring 15 i.e. when the numbers of rings 15 is large, the expanding coefficient of water supply suspending piece 1 becomes larger so as to fit the larger inside diameter of the water piping, and when the number of rings 15 is small, the coefficient becomes smaller conversely so as to fit to a smaller diameter of water piping.

Whole constitution of the present device is as described above, and when compared with the customary type of water supply suspending implement with stopping plug, wherein outer and inner tubes having larger and smaller diameters are used, and screws are provided on the inner periphery and the outer periphery of a smaller diameter inner tube, and screws on the outer periphery of a smaller diameter inner tube and on the inner periphery of a larger diameter outer tube are provided through their whole length, and the constitution of the screw is complex, the elongated rod 5 and outer tube 7 of the present device are not in screw-fitting relation, and accordingly an elongated screw is not provided, but a screw is provided on only one part at the tip end of elongated rod 5, and thus the present construction differs from the customary type in the viewpoint of simplicity, and the operation of elongated rod 5 and outer tube 7 in the present device differs from inner and outer tubes in the customary type in the basic mode of operation. Further, in the customary type where expansion and contraction of the water supply suspending piece 1 is performed by screw motion of the elongated screw, it necessitates a time and the draining water quantity becomes large, while in the present device where said operation is performed by merely turning motion of guide arm 13, perfect water suspending is performed rapidly and excessive wetting of the work area is prevented and there is no fear that the water supply blocking plug 1 will be pushed back in the case of high water pressure, and it differs from the customary type in such a viewpoint that the expanding operation does not become difficult.

What is claimed is:

1. A device for stopping the flow of water through an open pipe, comprising: an expandable plug formed of elastic material; a screw having a normal screw thread extending axially from said plug; a second screw of smaller diameter than said first screw and extending axially from the end of said first screw, said second screw having a reverse screw thread; a nut screw-fitted on said normal screw thread and adapted to contact the end of the plug; an elongated rod axially screwed to the end of said reverse screw thread, said elongated rod extending outwardly in an axial direction from said plug and having a turning handle at the end thereof; an outer tube loosely inserted over the forward part of said elongated rod and extending over said normal screw thread and said reverse screw thread and fitting over said nut at the tip end thereof; a pair of forced-contact opening and closing elements slidably extending over said elongated rod and axially spaced from the end of said outer tube; front and rear movable links hingedly attached one to each of said pair of forced-contact elements, with the other ends of said links hinged together; a guide arm fixed to one side of said links; elastic buffer tubes slidably provided on said elongated rod, one located between the rearmost of said forced-contacting opening and closing elements and said turning handle, and the other between the frontmost of said forced-contacting opening and closing elements and the end of said outer tube; and means for adjusting the degree of expansion of said plug, said means comprising at least one adjusting ring slidably placed on said elongated rod between the end of said outer tube and said elastic buffer tube.

* * * * *